(12) United States Patent
So et al.

(10) Patent No.: US 9,213,440 B2
(45) Date of Patent: Dec. 15, 2015

(54) SYSTEM AND METHOD FOR REMOTE TOUCH DETECTION

(75) Inventors: Chi W. So, Houston, TX (US); Juan I. Martinez, Tomball, TX (US)

(73) Assignee: Hewlett-Packard Development Company L.P., Houston, TX (US)

( * ) Notice: Subject to any disclaimer, the term of this patent is extended or adjusted under 35 U.S.C. 154(b) by 128 days.

(21) Appl. No.: 13/700,455

(22) PCT Filed: Jul. 27, 2010

(86) PCT No.: PCT/US2010/043447
§ 371 (c)(1),
(2), (4) Date: Nov. 28, 2012

(87) PCT Pub. No.: WO2012/015395
PCT Pub. Date: Feb. 2, 2012

(65) Prior Publication Data
US 2013/0088462 A1    Apr. 11, 2013

(51) Int. Cl.
*G06F 3/042* (2006.01)
*G06F 3/038* (2013.01)

(52) U.S. Cl.
CPC .............. *G06F 3/042* (2013.01); *G06F 3/0386* (2013.01)

(58) Field of Classification Search
CPC ... G06F 3/0386; G06F 3/042; G06F 3/03542; G06F 3/03545; G06F 3/0425; G06F 3/0421; G02B 27/20
USPC ................ 345/179, 175–176, 156, 158, 180; 178/18.09, 19.05
See application file for complete search history.

(56) References Cited

U.S. PATENT DOCUMENTS

| | | | |
|---|---|---|---|
| 6,498,602 B1 * | 12/2002 | Ogawa | 345/173 |
| 7,091,949 B2 | 8/2006 | Hansen | |
| 2004/0095312 A1 | 5/2004 | Chen | |
| 2005/0243070 A1 * | 11/2005 | Ung et al. | 345/176 |
| 2009/0091532 A1 | 4/2009 | Hockett | |
| 2009/0219253 A1 * | 9/2009 | Izadi et al. | 345/173 |
| 2009/0309834 A1 | 12/2009 | Adams | |

(Continued)

FOREIGN PATENT DOCUMENTS

| | | |
|---|---|---|
| KR | 20010004860 | 1/2001 |
| KR | 20030046093 | 6/2003 |

(Continued)

OTHER PUBLICATIONS

PCT; "Notification of Transmittal of the International Search Report and the Written Opinion of the International Searching Authority, or the Declaration"; cited in PCT/US2010/043447; dated Apr. 28, 2011; 9 pages.

(Continued)

*Primary Examiner* — Hong Zhou
(74) *Attorney, Agent, or Firm* — Hewlett-Packard Patent Department

(57) ABSTRACT

Embodiments of the present invention disclose a system and method for remote touch detection. According to one embodiment, an infrared light source is projected across a front surface of a display via at least one light emitting device. Furthermore, an infrared signal is transmitted in a direction of the front surface of the display via a remote pointing device. A surface target position is then determined based on measurement data caused by disruption of a portion of the infrared light source of the light emitting device by either the infrared signal or a physical touch from a user.

20 Claims, 7 Drawing Sheets

(56) References Cited

U.S. PATENT DOCUMENTS

| | | |
|---|---|---|
| 2010/0090985 A1 | 4/2010 | Newton |
| 2010/0295802 A1* | 11/2010 | Lee ............................. 345/173 |
| 2010/0328267 A1* | 12/2010 | Chen ............................ 345/175 |
| 2011/0291988 A1* | 12/2011 | Bamji et al. ................. 345/175 |

FOREIGN PATENT DOCUMENTS

| | | |
|---|---|---|
| KR | 20040078271 | 9/2004 |
| KR | 10-0910024 A | 11/2008 |
| KR | 10-2009-0026957 A | 3/2009 |
| KR | 10-2008-0100008 A | 7/2009 |
| KR | 10-0913758 B1 | 8/2009 |
| KR | 10-200968205 B1 | 7/2010 |

OTHER PUBLICATIONS

Steve Hodges, Shahram Izadi, Alex Butler, Alban Rrustemi, Bill Buxton; pp. 259-268; 2007; ACM; Cite 2 source: Proceedings of the 20th annual ACM symposium on User Interface software and technology URL for cite 2: http://dl.acm.org/citation.cfm?doid=1294211.1294258.

* cited by examiner

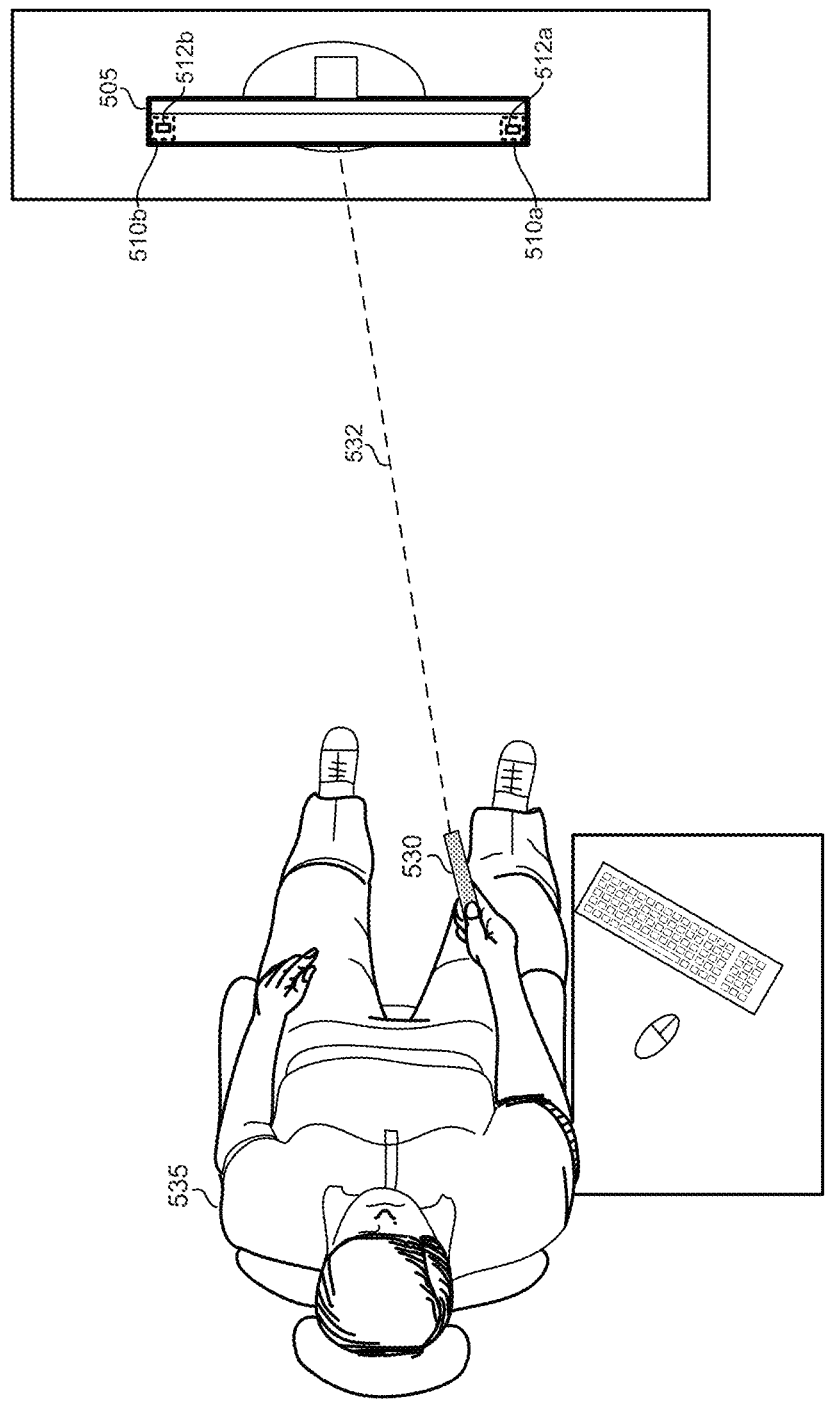

SYSTEM AND METHOD FOR REMOTE TOUCH DETECTION

BACKGROUND

Providing efficient and intuitive interaction between a computer system and users thereof is essential for delivering an engaging and enjoyable user-experience. Today, most computer systems include a keyboard for allowing a user to manually input information into the computer system, and a mouse for selecting or highlighting items shown on an associated display unit. As computer systems have grown in popularity, however, alternate input and interaction systems have been developed. For example, touch-based, or touchscreen, computer systems allow a user to physically touch the display unit and have that touch registered as an input at the particular touch location, thereby enabling a user to interact physically with objects shown on the display of the computer system.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which:

FIG. 5A illustrates an exemplary environment of a user interacting with the computer vision system, while FIG. 5B illustrates a top down view perspective view of the computer vision system and the operating user shown in FIG. 5A according to one embodiment of the present invention.

DETAILED DESCRIPTION OF THE INVENTION

The following discussion is directed to various embodiments. Although one or more of these embodiments may be specified, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

While touch technology is an exciting and natural means of user interface, it can still be improved. One fundamental drawback of conventional touchscreen interface systems is that the user must be within a few feet of the touchscreen computer for operation. In addition to limiting user movement and system placement, physical touching of the display screen may also cause arm and shoulder fatigue with extended use of the system.

Embodiments of the present invention provide a system and method for remote touch detection capable utilizing existing touchscreen computer system without hardware modification. That is, the touchscreen computer vision system is capable of supporting both physical touch, or "black or shadow" detection, and remote touch, or "white" detection. As such, embodiments in accordance with the present invention allow system interaction with an laser beam or infrared signal such as one from a laser pointer, thereby enabling users to remotely interface with a touchscreen system while maintaining line-of-sight contact of the laser beam with the front surface of the display.

Several advantages are afforded by the remote touch input method of the present embodiments. For example, the operating user does not need to be in close proximity to the touch display in order to interface with it. Accordingly, such a configuration allows for greater user mobility and more flexible placement of the touchscreen display. Furthermore, the remote touch system of the present embodiments helps to alleviate arm and shoulder fatigue caused by extended sessions of physically touching a vertical screen since user input can now be done from a comfortable location with only the press of a button or a flick of the wrist from the remote pointing device.

Figure 1:
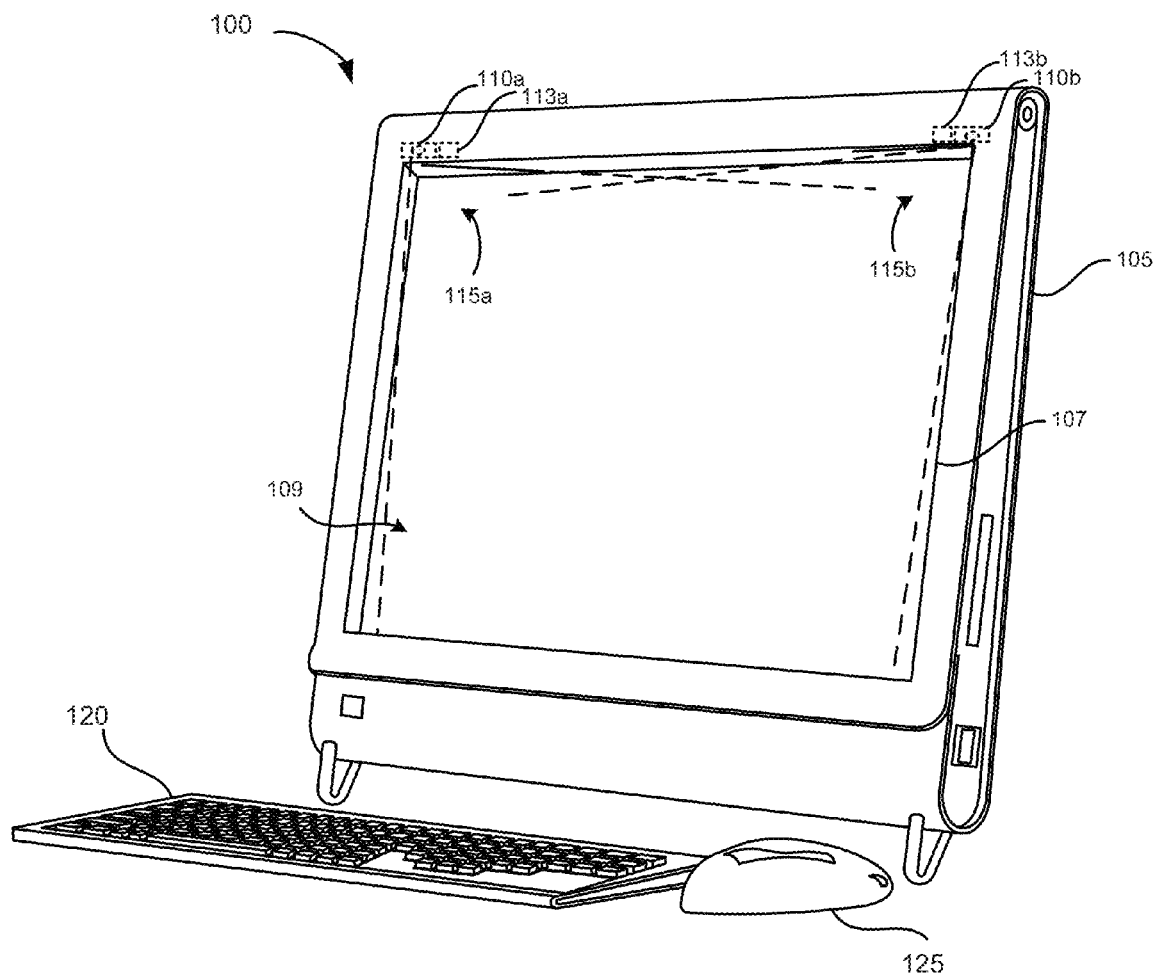
FIG. 1 is a three-dimensional perspective view of an all-in-one touchscreen computing system according to an embodiment of the present invention.

Referring now in more detail to the drawings in which like numerals identify corresponding parts throughout the views, FIG. 1A is a three-dimensional perspective view of an all-in-one computer having multiple optical sensors, while FIG. 1B is a top down view of a display device and optical sensors including the field of views thereof according to an embodiment of the present invention. As shown in FIG. 1A, the system 100 includes a housing 105 for enclosing a display panel 109 and light emitting devices 113a and 113b and optical sensors 110a and 110b. The system also includes input devices such as a keyboard 120 and a mouse 125 for text entry, navigating the user interface, and manipulating data by a user for example.

The display system 100 may includes a display panel 109 and a transparent layer 107 in front of the display panel 109, though the transparent layer 107 may be omitted in certain embodiments. The front side of the display panel 109 is the surface that displays an image and the back of the panel 109 is opposite the front. Light emitting devices 113a and 113b and optical sensors 110a and 110b can be on the same side of the transparent layer 107 as the display panel 109 to protect the optical sensors from contaminates. In an alternative embodiment, the light emitting device and optical sensors 110a and 110b may be in front of the transparent layer 107. The transparent layer 107 can be glass, plastic, or another transparent material. The display panel 109 may be a liquid crystal display (LCD) panel, a plasma display, a cathode ray tube (CRT), an OLED or a projection display such as digital light processing (DLP), for example. In one embodiment, mounting the light emitting devices 113a and 113b and optical sensors 110a and 110b in an area of the display system 100 that is outside of the perimeter of the of the display panel 109 provides that the clarity of the transparent layer is not reduced by the light emitting devices or optical sensors.

In one embodiment, optical sensors 110a and 110b represent may two-dimensional cameras including a charge-coupled device (CCD) or complementary metal-oxide semiconductor (CMOS) phototransistors for example, and are configured to receive external light or shadows and convert the light or shadow to data. In another embodiment, optical sensors 110a and 110b represent three-dimensional optical sensors configured to report a three-dimensional depth snap to a processor. The three-dimensional optical sensors 110a and 110b can determine the depth of an object located within its respective field of view 115a and 115b. The depth map changes over time as an object and signal moves in the respective field of view 115a of optical sensor 110a, or within the field of view 115b of optical sensor 115b. According to one embodiment, the depth of the object can be used to determine if the object is within a programmed distance of the display panel but not actually contacting the front side of the display panel. For example, the object may be a user's hand or finger approaching the front side of the display panel 109, or an infrared signal emitted from a laser pointing device operated by a user. Still further, and according to one embodiment, optical sensors 110a and 110b are positioned at top most corners around the perimeter of the display panel 109 such that each field of view 115a and 115b includes the areas above and surrounding the display panel 109. As such, a touch input such as a user's hand or infrared signal for example, may both be detected, and any associated motions around the perimeter and in front of the computer system 100 can be accurately interpreted by the computer processor.

Figure 2:
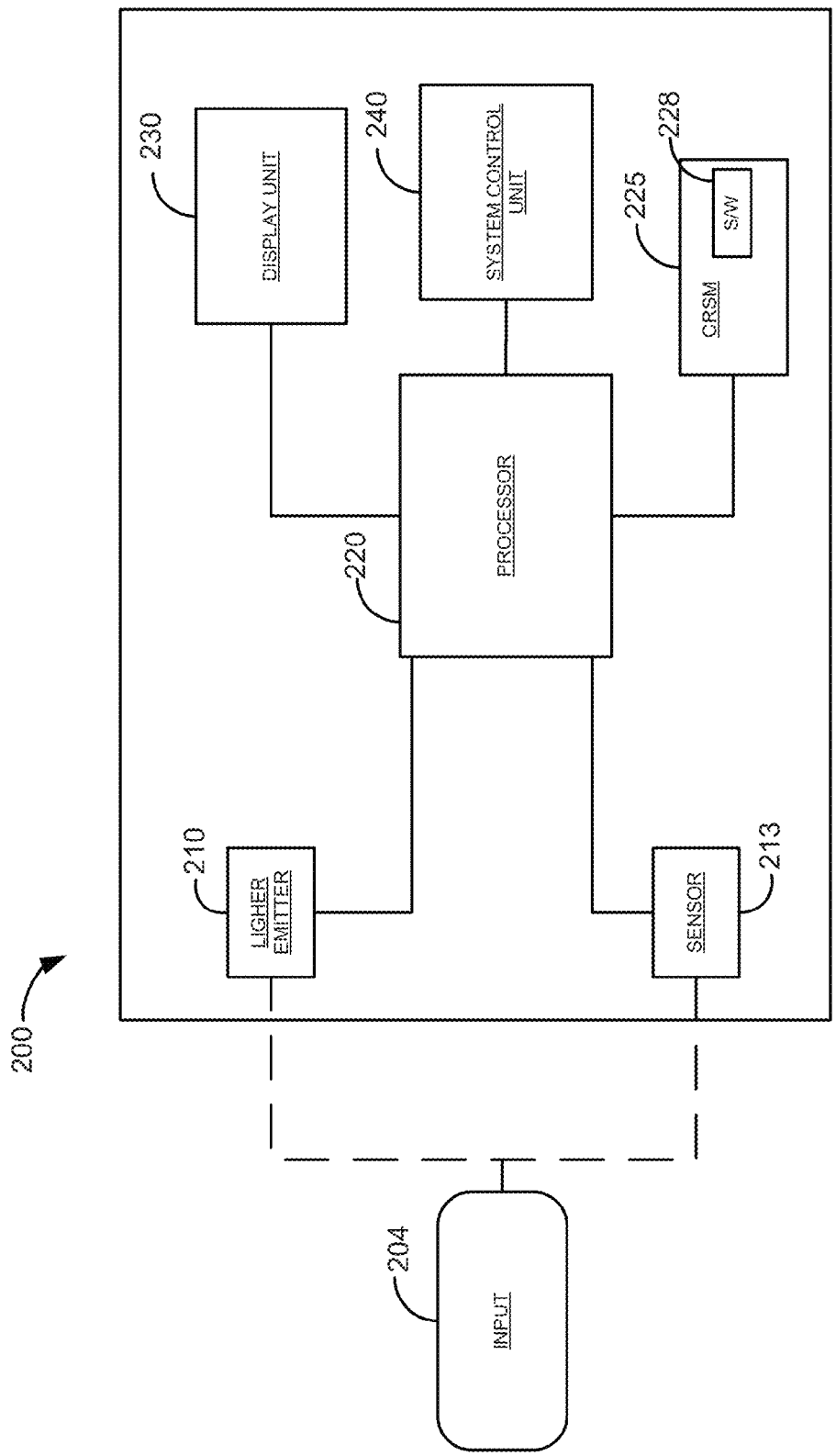
FIG. 2 is a simplified block diagram of the touchscreen computer vision system according to an embodiment of the present invention.

FIG. 2 is a simplified block diagram of the computer vision system according to an embodiment of the present invention. As shown in this exemplary embodiment, the system 200 includes a processor 220 coupled to a display unit 230, a system control unit 240, a computer-readable storage medium 225, light emitter 210, and optical sensor 213 configured to capture touch input 204, or measurement data related to an object or input disruption near the front of the display unit 230. In one embodiment, processor 220 represents a central processing unit configured to execute program instructions. Display unit 230 represents an electronic visual display or touch-sensitive display such as a desktop flat panel monitor configured to display images and a graphical user interface for enabling interaction between the user and the computer system. Storage medium 225 represents volatile storage (e.g. random access memory), non-volatile store (e.g. hard disk drive, read-only memory, compact disc read only memory, flash storage, etc), or combinations thereof. In one embodiment, system control unit 240 may represent an application program or user interface control module configured to receive and process measurement data of a detected object. Furthermore, storage medium 225 includes software 228 that is executable by processor 220 and, that when executed, causes the processor 220 to perform some or all of the functionality described herein.

Figure 3:
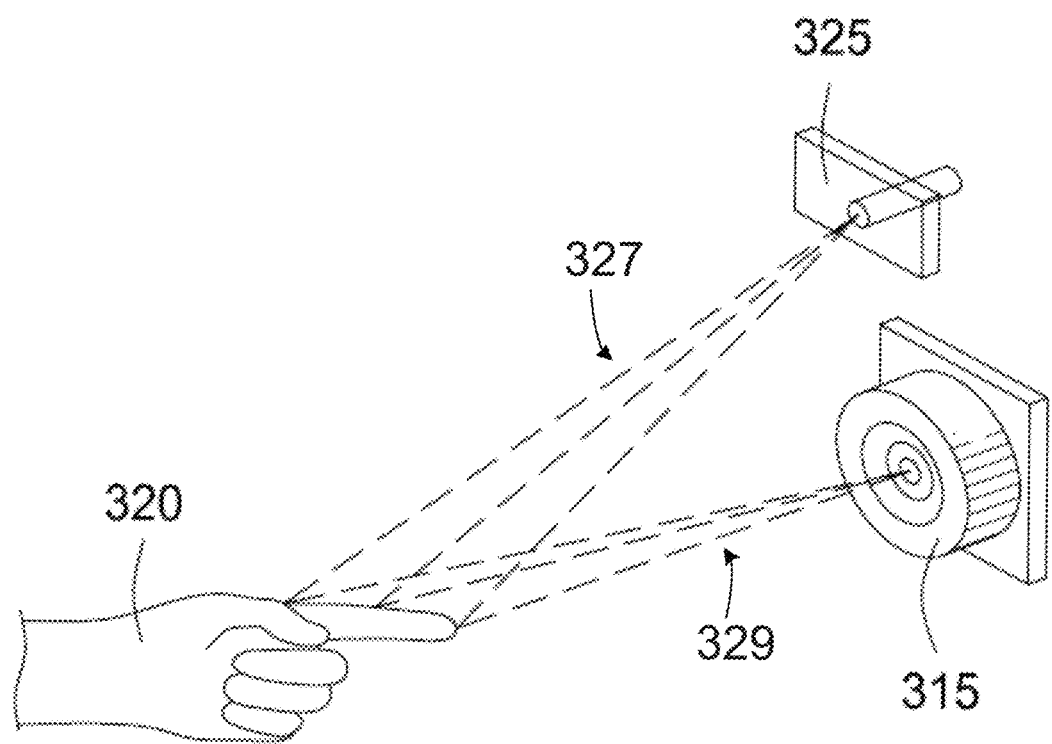
FIG. 3 is an illustrative example of operation of a light emitting device and optical sensor according to an embodiment of the invention.

FIG. 3 is an illustrative example of operation of the light emitting device and optical sensor according to an embodiment of the invention. The light emitting device 325 is configured to project a light source 327 such as an infrared light or a laser light source for example, that emits light and may be invisible to the user. In one embodiment, the light emitting device 325 emits a structured light that is projected as a light pattern such as a plane, grid, or more complex shape at a known angle. The way that the light pattern deforms when disrupted by an object or light source, allows the computer vision system to calculate the depth and surface information of the object or light source. For example, the optical sensor 315 can receive disrupted light 329 as measurement data, which is reflected from a light emitting device 325 from an object 320 for example. Furthermore, the light emitting device 325 can be in any position relative to the optical sensor 315 that allows the light source 327 to be disrupted or reflected off the object 320 and be captured by the optical sensor 315. The infrared light 325 can be disrupted and reflected from an object 320 such as user's hand or other light source, so as to be captured by the optical sensor 315.

Figure 4A:
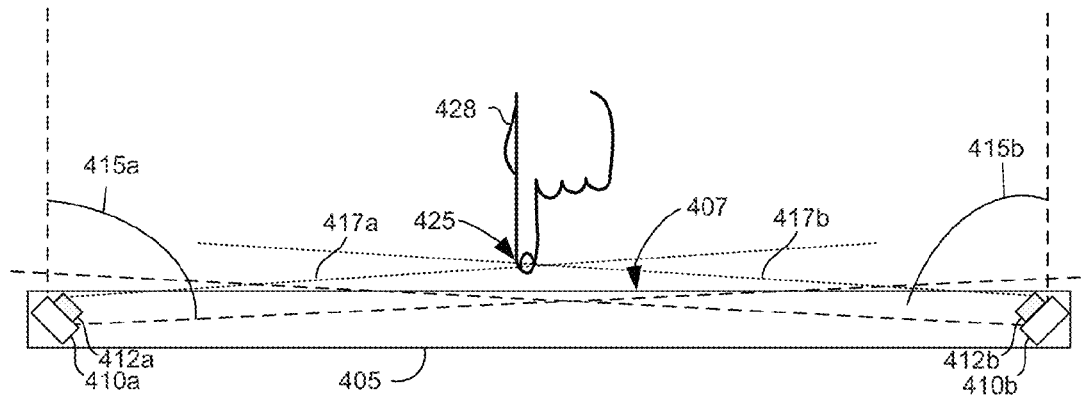
FIGS. 4A and 4B are top down perspective views of the computer vision system and operating environments thereof according to an embodiment of the present invention.
Figure 4B:
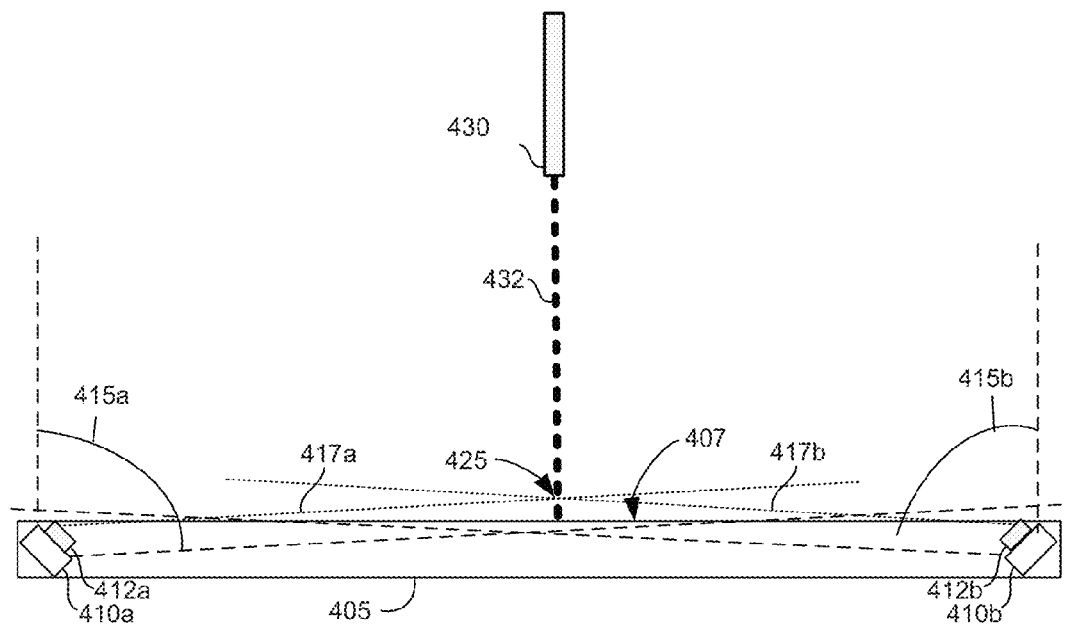

FIGS. 4A and 4B are top down perspective views of the computer vision system and operating environments thereof according to an embodiment of the present invention. As shown in the embodiment of FIG. 4A, the touchscreen system includes a display 405 for enclosing light emitting devices 412a and 412b and optical sensors 410a and 410b. According to the present embodiment, light emitting devices 412a and 412b project light source 417a and 417b respectively. More specifically, the light emitters 412a and 412b projects a plane of infrared light 417a and 417b that covers the front surface 407 of the display panel 405. Optical sensors 410a and 410b include respective fields of views 415a and 415b configured to detect and capture disruptions in either light source 417a or 417b caused by an input object or device approaching the front display surface 407. The object may be a physical object such as a finger or stylus is in contact with the display surface 407 as shown in FIG. 4A, or an invisible input or infrared signal emitted onto the front surface 407 of the display as shown in FIG. 4B.

More particularly, an object such as a user's hand 428 may approach the display 405 and cause a disruption in either light source 417a or 417b at position 425 in FIG. 4A. Similarly, a remote pointing device 430 operated by a user may output an infrared signal 432 in the direction of the display 405 so as to cause a disruption in the plane of either light source 417a or 417b at position 425 in FIG. 4B. When the infrared signal 432 disrupts the plane of either light source 417a or 417b, the disruption is accordingly detected by one of the optical sensors 410a or 410b. Thereafter, a processing controller receives measurement or disruption information from the optical sensors in the form of a shadow data where the disrupted area may appear black or white for example.

Figure 5A:
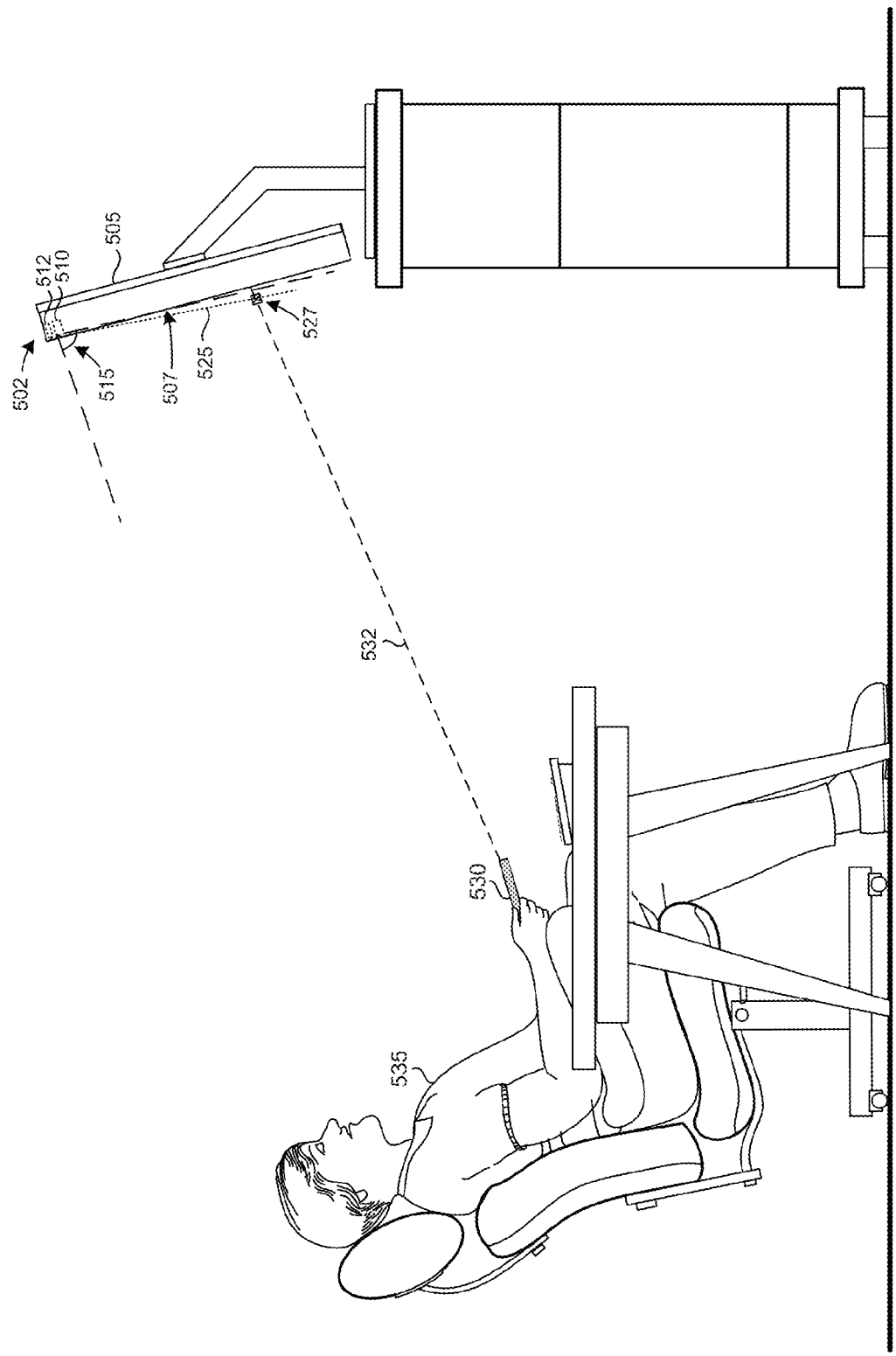

FIG. 5A illustrates an exemplary environment of a user interacting with the computer vision system, while FIG. 5B illustrates a top down view perspective view of the computer vision system and an operating user shown in FIG. 5A according to one embodiment of the present invention. As shown in FIGS. 5A and 5B, the operating environment includes a user 535 aiming a remote pointing device 530 at a display system 502. The user may be positioned further away (e.g. greater than one meter) from the display system than traditional touchscreen operating environments. Like the previous embodiments, the display system includes a light emitting device 510 configured to project a light source plane 525 across the front surface 507 of the display panel 505, and an optical sensor 510 configured with a field of view 515. Furthermore, as the infrared signal 532 from the remote pointing device 530 approaches the front surface of the display panel, the signal 532 eventually breaks and disrupts a portion of the light source 525 or plane thereof.

As shown in the embodiment of FIG. 5A, the plane of the light source 525 is disrupted by the infrared signal 532 near position 527, which is proximate to the front surface of the display panel. Thereafter, the optical sensor 510 captures the light caused by the disruption and associates measurement data therewith. For example, in the case of a physical disruption from a stylus or hand for example, the optical sensors are configured to capture measurement data having an approximate "black" color value at or near (0, 0, 0) within a RGB color model caused by the change in intensity of the light source emitted by the light emitters at the area of disruption. Similarly, in the case of a disruption from a light source such as a laser beam or infrared signal from a remote pointing device for example, the optical sensors are also configured to simultaneously capture measurement data having an approximate "white" color value at or near (255, 255, 255) within a RGB color model caused by the change in intensity of the light source emitted by the light emitters at the area of disruption. Based upon this disruption and measurement data, the processor of the computer vision system can determine the approximate location of the disruption and the surface target position, which is the desired touch input location on the front surface of the display panel. Furthermore, and as shown in the embodiment of FIGS. 5A-5B, the user 535 and the user's hand is in a natural and relaxed positioned while interacting with the computer vision system 502.

Figure 6:
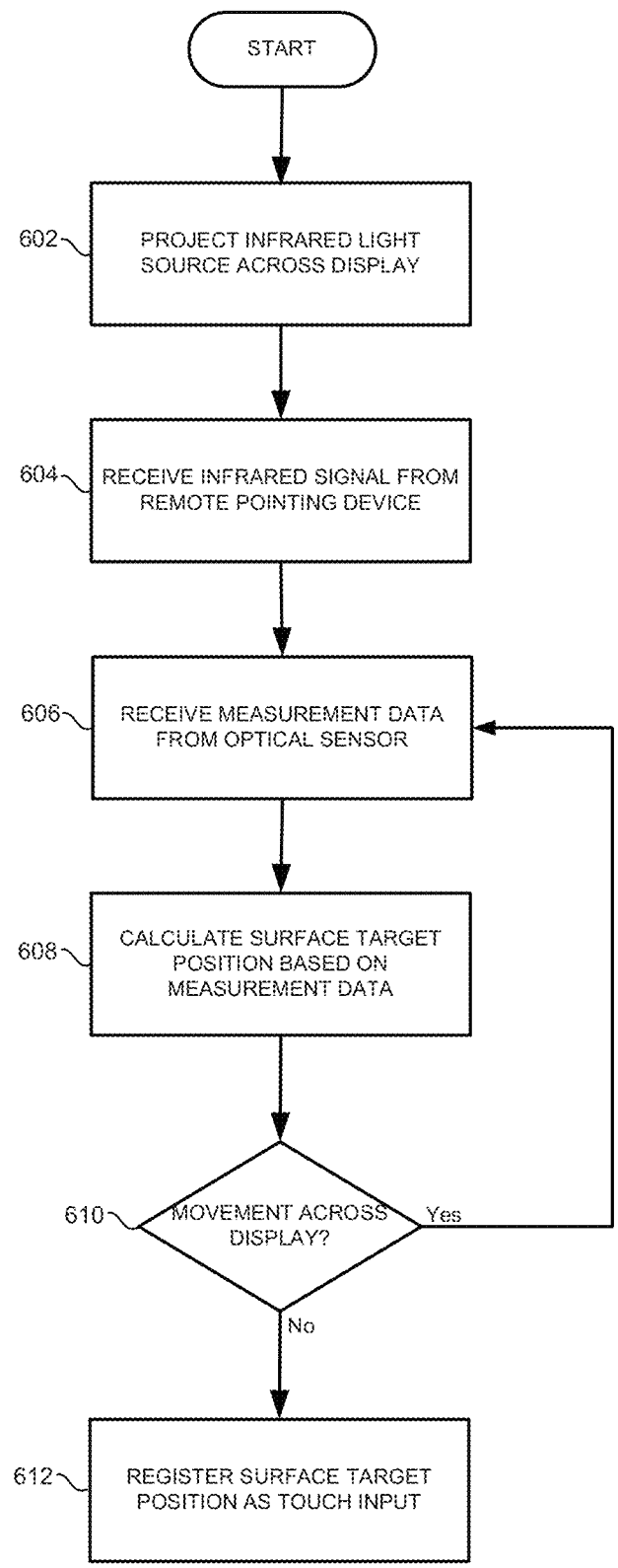
FIG. 6 illustrates the processing steps for the remote input detection according to an embodiment of the present invention.

FIG. 6 illustrates the processing steps for remote touch detection according to an embodiment of the present invention. In step 602, the computer vision system projects an infrared light source as a plane to cover the front surface of the display device. Next, in step 604 an infrared signal from a user operating a remote pointing device directed towards the front surface of the display, is received at the light source projected by the light emitting device. A disruption in the light source is then captured by the optical sensor as measurement or disruption data in step 606. That is, the optical sensor detects the relative location of the disruption on the front surface of the display caused by the infrared signal or physical object breaking and disrupting the plane of the light source from the light emitting device.

In step 608, the processor calculates the surface target position based on measurement data captured by the optical sensor. Next, in step 610, the system determines if the surface target position has moved, or if the user is moving the remote pointing device or physical object across the front display surface, and if so, updates the surface target position accordingly. According to one embodiment, once the surface target position is stationary for a predetermined time, the processor registers the surface target position as a touch input location in step 612 for determining an appropriate operation of the computer system.

Embodiments of the present invention provide a method for implementing a remote pointing device for use with touchscreen computer vision systems. In particular, the computer vision system of the present embodiments is configured to detect touch inputs caused by physical objects contacting a front surface of the display panel, in addition to touch inputs caused by an infrared light source contacting the front surface of the display panel. As such, a laser pointing device operated by a user and emitting an infrared signal may serve as a remote operating device for controlling and operating a touchscreen computing system.

Many advantages are afforded by the remote touch detection system and method according to embodiments of the present invention. For instance, the display panel of the touchscreen computing system may be placed in a location in which physical touch of the display is difficult or impossible (e.g. ceiling mounted). In such a case, the user may operate the computing system remotely from a more comfortable position than normal (e.g. lying down). Still further, the computer vision system of the present embodiments helps to reduce upper body fatigue caused by prolonged extension of a user's arms when physically contacting the display panel with their hands or a stylus for example. Moreover, embodiments of the present invention can be beneficial for users with physical disabilities by attaching the laser emitter to a headband or body part other than the user's hand for example.

Furthermore, while the invention has been described with respect to particular embodiments, one skilled in the art will recognize that numerous modifications are possible. For example, although exemplary embodiments depict an all-in-one computer as the representative display panel of the computer vision system, the invention is not limited thereto. For example, the computer vision system of the present embodiments may be implemented in a netbook, a tablet personal computer, a cell phone, or any other electronic device having a display panel, light emitting device, and optical sensor.

Still further, a single light emitting device and single optical sensor may be utilized in the computer visions system in lieu of the two emitting devices and two optical sensors depicted in the figures. Thus, although the invention has been described with respect to exemplary embodiments, it will be appreciated that the invention is intended to cover all modifications and equivalents within the scope of the following claims.

What is claimed is:

1. A method for interacting with a computer system having a display, the method comprising:
   from at least one light emitting device projecting a plane of structured infrared light across a front surface of the display;
   simultaneously enabling detection using a common optical sensor, of both a physical touch and a remote touch by a change in infrared light on the front surface of the display; and
   determining a target position on the front surface of the display based on the detected change in infrared light on the front surface of the display.

2. The method of claim 1, wherein determining the target position further includes measuring the infrared light with a least one optical sensor positioned on the front surface of the display.

3. The method of claim 2, wherein the display includes at least two optical sensors positioned on different sides of the front surface of the display.

4. The method of claim 1, further comprising continually updating the target position.

5. The method of claim 1, wherein the projecting comprises projecting the infrared light so as to cover the entire front surface of the display.

6. The method of claim 1, wherein the change in infrared light is from a user-controlled infrared pointer located greater than 1 meter from the front surface of the display.

7. The method of claim 1 wherein the plane of structured infrared light forms a grid pattern on the front surface of the display.

8. A computer system comprising:
   a display including a front surface for displaying images to a user;
   a light emitting device positioned proximate to the front surface of the display and to project a plane of structured infrared light across the front surface of the display;
   at least one optical sensor to measure intensity of the plane of structured infrared light across the front surface of the display;
   a processor coupled to the at least one optical sensor and to detect a location where a signal disrupts the plane of structured infrared light as a change in the intensity of the plane of structured infrared light measured by the at least one optical sensor across the front surface of the display to determine a target position on the front surface of the display based on the detected change in intensity wherein the processor simultaneously enables detection of both increases and decreases in intensity resulting from both direct and remote touch using a common optical sensor.

9. The system of claim 8, wherein the at least one optical sensor is to capture measurement data caused by the disruption of the infrared signal.

10. The system of claim 8, wherein the infrared light source projects so as to cover the entire front surface of the display.

11. The system of claim 8, wherein the at least one optical sensor comprises at least two optical sensors positioned on opposite sides of the front surface of the display.

12. The system of claim 8, wherein a surface target position can be determined for a user operating the remotely positing device at a distance greater than one meter from the front surface of the display.

13. The system of claim 8, wherein the plane of structured infrared light forms a grid pattern on the front surface of the display.

14. A non-transient computer readable storage medium having stored executable instructions, that when executed by a processor, causes the processor to perform operations comprising:
   from at least one optical sensor positioned on a front surface of a display, receive intensity measurements of a plane of structured infrared light projected across a front surface of the display;
   detecting a location where a touch disrupts the plane of structured infrared light as a change in the intensity measurements of the plane of structured infrared light across the front surface of the display, wherein the processor simultaneously enables both detection of disruption by a remote touch infrared signal and enables detection of disruption by a physical touch using a common optical sensor; and
   determining a surface target position based on the front surface of the display based on the detected change in intensity.

15. The computer readable storage medium of claim 14, wherein the executable instructions further cause the processor to:
   continually update the surface target position.

16. The computer readable storage medium of claim 15, wherein the processor registers the position as a touch input location when the position determined from disruption by an infrared signal remains stationary for a predetermined time.

17. The computer readable storage medium of claim 14, wherein the at least one optical sensor comprises a plurality of optical sensors located on different sides of the front surface of the display.

18. The computer readable storage medium of claim 14, wherein the plane of structured infrared light projected across a front surface of the display is a uniform plane.

19. The computer readable storage medium of claim 14, wherein the plane of structured infrared light projected across a front surface of the display is a grid pattern.

20. The computer readable storage medium of claim 14, wherein the plane of structured infrared light projected across a front surface of the display covers the entire front surface of the display.

* * * * *